(No Model.)
J. A. NEILSON.
FRICTION CLUTCH.
No. 270,099. Patented Jan. 2, 1883.
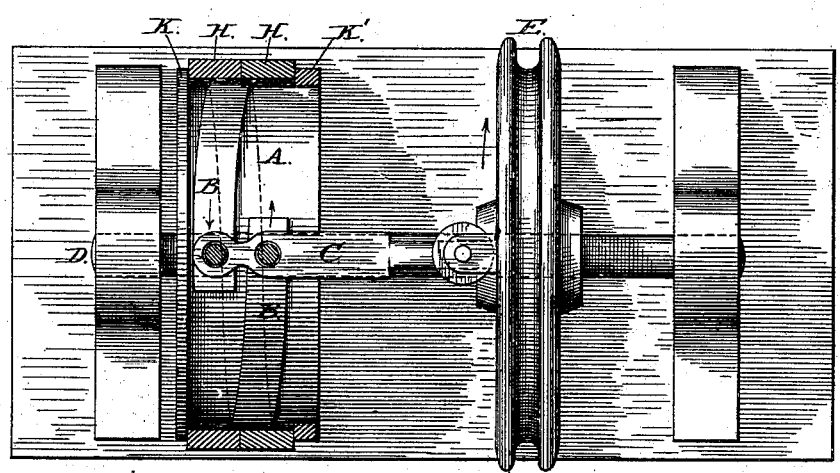
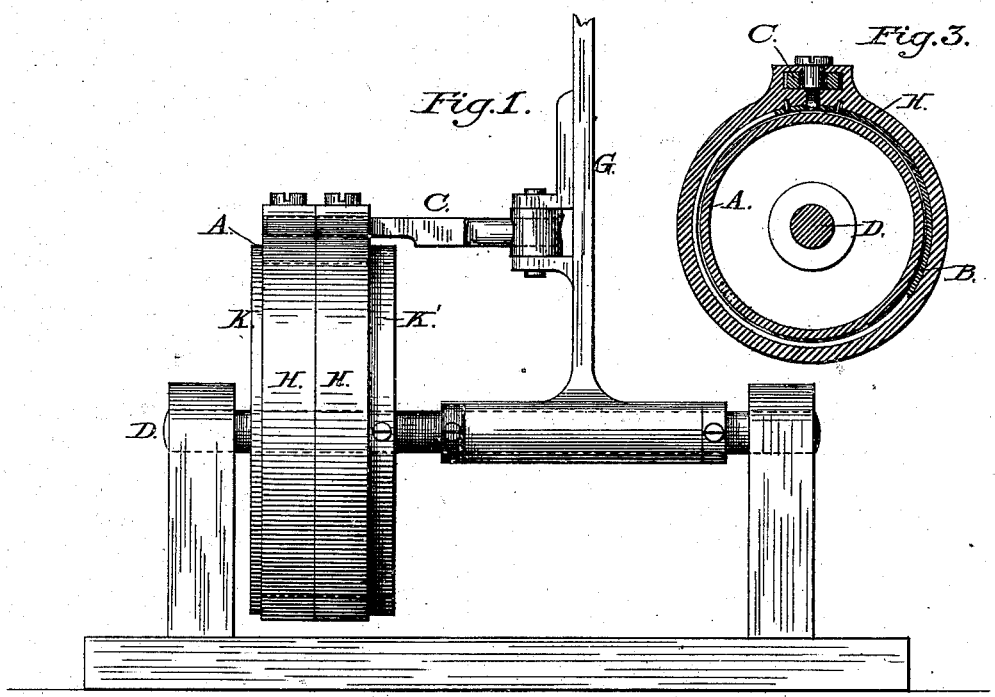
Witnesses:
John A. Ellis
J. F. Acker, Jr.
Inventor:
James A. Neilson
By David A. Burr
Attorney.

UNITED STATES PATENT OFFICE.

JAMES A. NEILSON, OF PHILADELPHIA, PENNSYLVANIA.

FRICTION-CLUTCH.

SPECIFICATION forming part of Letters Patent No. 270,099, dated January 2, 1883.

Application filed August 22, 1882. (No model.)

*To all whom it may concern:*

Be it known that I, JAMES A. NEILSON, of the city of Philadelphia, in the State of Pennsylvania, have invented a new and useful Improvement in Frictional Clutches; and I do hereby declare that the following is a full and exact description thereof, reference being had to the accompanying drawings, and to the letters of reference marked thereon, making a part of this specification.

My invention relates to the use of a friction-band upon a drum or pulley as a clutch by which to impart thereto a rotary motion in one direction only, or as a stop to prevent a reverse motion thereof; and it consists in securing side by side the two ends of a flexible band carried around a pulley to the inner end of a lever-bar extending parallel with the axis of the pulley, and whose opposite end, when it is to be used to impart motion to the pulley, is pivoted either to a swinging lever, rocking upon an axis in line with the axis of the pulley-shaft, or to the side of an independent rotating disk or pulley whose axis is coincident with that of the friction-band pulley, so that when the lever is swung or the disk rotated in one direction its tension upon the arm shall cause the arm to tighten the friction-band and cause it to engage the pulley, and in the opposite direction shall operate to loosen the band, so that it shall slip freely over the face of the pulley without moving it. When the lever and band are to be employed for preventing a reverse movement of the pulley the outer end of the clutch-lever is pivoted or secured to a fixed support. The device will operate effectively as a substitute for a ratchet in converting a reciprocating into a rotating movement, or in preventing a reverse movement of a rotating pulley, and is not only independent of any fixed pitch of tooth or number of pawls—such as limit an ordinary pawl-and-ratchet gear—but avoids the noise attendant upon the action thereof.

In the accompanying drawings, Figure 1 is an elevation of my improved clutch, operated by a lever; Fig. 2, a plan of the device when operated by a pulley, the outer casing-rings covering and protecting the friction-band being broken away to disclose the band. Fig. 3 is a transverse axial section of the friction-band pulley and covering-ring.

The pulley or drum A, to which the friction-band is applied, may be of any suitable description, being simply made wide enough upon its face to admit of the lapping of the two ends of the friction-band side by side thereon.

The friction-band B is preferably made of a thin flexible metallic plate, which is carried about the face of the pulley, and is long enough to admit of its two ends lapping when brought together. The two ends are made to pass each other side by side, so that the band describes a spiral in its turn about the pulley. The two ends of the friction-band are each pivoted to a clutch bar or lever, C, laid upon it in line parallel with the shaft D, upon which the pulley is secured or upon which it revolves, and this bar C is extended to reach the lateral face of a driving-pulley, E, rotating independently upon an axis coincident with that of the band-pulley A. The clutch bar or lever C is coupled to the driving-pulley E by means of a swiveled joint, so that the rotation of the pulley shall carry the lever with it without undue strain thereon. If the clutch-lever be thus carried in the same direction as that in which the inner end of the friction-band is led, the lever, turning upon its pivot on said end as a fulcrum, will draw up and tighten the outer end of the friction-band upon the face of the drum or pulley A with so much force, owing to the long leverage obtained thereon, as to lock the band upon the pulley, and thus cause it to revolve in common with the master-pulley or disk E, to which the lever is pivoted. If, however, the disk or pulley E be rotated in the opposite direction, the function of the clutch-lever C is immediately reversed, for, turning still upon its inner pivotal connection with the band as a fulcrum, it will now throw the other end of the band in the opposite direction, so as to loosen the hold of the band upon its drum or pulley A and allow it to slip freely over and about the same, and the lever and band will revolve loosely upon the drum A without moving it. This modification of my invention is adapted for use with sewing-machines and other forms of machinery in which it is desirable to prevent a reverse movement of the driven shaft or pulley.

Instead of pivoting the clutch-lever C to an independent driving-pulley, E, so that the drum or pulley shall be made thereby to rotate with said pulley E when it revolves in one direction, but shall be released therefrom and remain unmoved thereby when it rotates in the opposite direction, the clutch-lever may be pivoted to the side of a rocking lever, G, Fig. 1, journaled loosely upon the shaft of the drum A, or fixed to an independent shaft or pivotal bearing in a right line therewith, so that when the lever is swung over in one direction it shall cause the drum to rotate with it in that direction, but when swung back in the opposite direction the friction-band shall slip loosely without moving the drum. The reciprocating to-and-fro movement of the lever G will thus be made to produce a rotation of the drum A in one direction only, and the device will operate in effect as a ratchet in converting a reciprocating into a rotary movement, but without the noise or lost motion incident to a pawl and ratchet. This modification of my invention is applicable to drills of all descriptions, and as a substitute for a pawl and ratchet in all cases.

When the device is to be used simply as a stop for preventing a reverse rotation of the drum or pulley A the outer end of the clutch-lever C is pivoted or secured to an immovable arm or other support, instead of to a movable disk or lever, and in such case, so long as the pulley A revolves in the same direction as that in which the end of the spiral friction-band which is attached to the inner end of the lever C points, its frictional contact with the end of the band will operate to enlarge and loosen the band; but so soon as the motion of the pulley is reversed its friction against the end of the band will operate to move the end of the lever into its locking position and so contract and tighten the band as to bind it firmly about the pulley, and thus quietly and effectively stop its movement in that direction without any loss of motion.

The friction-band may be inclosed by continuous annular bands or casing-rings H H, placed side by side to completely cover and protect it. In such case one end of the friction-band is secured to one of the annular bands or casing-rings and the other to the other, and the clutch-lever, instead of being pivoted directly to the ends of the friction-band, is pivoted to each of the annular bands, as shown in the drawings, Fig. 3.

The casing-rings H H and the inclosed friction-band B are kept in place upon the drum A by means of a fixed flange, K, on one edge of the drum, and by a second detachable flange, K', fixed on its opposite edge.

It is evident that the combination and arrangement of a loose friction-band upon a drum or pulley, A, with a bar or lever arranged at right angles thereto in line with the axis of the pulley, and to which the two ends of the band are separately fastened or pivoted, admits of many modifications, may be operated at any inclination, and is applicable as a noiseless ratchet device for drills and small tools, as well as a clutch and back-stop for pulleys and shafting.

I claim as my invention—

1. The combination, with a loose friction-band encircling a pulley, of a transverse lever placed in line with the axis of the pulley, and to which the two ends of the friction-band are separately pivoted and secured, substantially in the manner and for the purpose herein set forth.

2. The combination, with a loose friction-band encircling a pulley, and with a bar or lever placed in line with the axis of the pulley, and to which the two ends of the friction-band are separately pivoted, of a radial arm or pulley journaled upon a shaft or pivot in a right line with the axis of the band-pulley to move independently thereof, substantially in the manner and for the purpose herein set forth.

3. The combination, with a loose friction-band encircling a pulley, and with a lever placed in line with the axis of said pulley, of two rings or annular casing-bands placed side by side over and upon the friction-band, and to the one and the other of which the lever is pivoted and the two ends of the band are respectively secured, substantially in the manner and for the purpose herein set forth.

In testimony whereof I have signed my name to this specification in the presence of two subscribing witnesses.

JAMES A. NEILSON.

Witnesses:
J. GORDON SHOWAKER,
WILLIAM JARDEN.